(12) United States Patent
Hamilton et al.

(10) Patent No.: US 6,474,412 B2
(45) Date of Patent: Nov. 5, 2002

(54) TUBING HANGER LANDING STRING WITH BLOWOUT PREVENTER OPERATED RELEASE MECHANISM

(75) Inventors: Scott M. Hamilton, Lanark (GB); Richard Kent, Newburgh (GB)

(73) Assignee: FMC Technologies, Inc., Chicago, IL (US)

( * ) Notice: Subject to any disclaimer, the term of this patent is extended or adjusted under 35 U.S.C. 154(b) by 0 days.

(21) Appl. No.: 09/861,288

(22) Filed: May 18, 2001

(65) Prior Publication Data

US 2002/0066557 A1 Jun. 6, 2002

(30) Foreign Application Priority Data

May 19, 2000 (GB) .............................................. 0012208

(51) Int. Cl.[7] .............................................. E21B 17/02
(52) U.S. Cl. .................. 166/77.51; 166/242.6
(58) Field of Search ............................ 166/77.51, 85.4, 166/338, 348, 242.6

(56) References Cited

U.S. PATENT DOCUMENTS

| | | | | |
|---|---|---|---|---|
| 3,661,206 A | * | 5/1972 | Putch et al. .................. 166/85 |
| 4,067,062 A | * | 1/1978 | Baugh ........................ 166/125 |
| 4,325,409 A | * | 4/1982 | Roberts .................. 137/596.14 |
| 4,540,053 A | * | 9/1985 | Baugh et al. ................ 166/348 |
| 5,145,006 A | * | 9/1992 | June ........................... 166/341 |
| 6,070,668 A | * | 6/2000 | Parks et al. .................. 166/345 |

FOREIGN PATENT DOCUMENTS

| | | |
|---|---|---|
| EP | 0 333 950 A1 | 9/1989 |
| EP | 0 756 125 A1 | 1/1997 |
| GB | 1060020 | 2/1967 |
| GB | 1 433 453 | 4/1976 |
| GB | 2 301 158 A | 11/1996 |

* cited by examiner

Primary Examiner—Frank S. Tsay
(74) Attorney, Agent, or Firm—Henry C. Query, Jr.

(57) ABSTRACT

A coupling is incorporated in the landing string which is non-destructively unlatched by the closure of BOP pipe rams. The coupling is simple and reliable to operate in emergencies. When the pipe rams are closed, the radial force releases a mechanism comprising captive pins and an outwardly biased split ring. The split ring is compressed inwardly, releasing shoulders on collet fingers from beneath an undercut in a bore of the coupling. Reconnection is simply achieved by re-engaging the collet fingers in the undercut. Other BOP closure element non-destructively operated landing string couplings are also disclosed.

16 Claims, 3 Drawing Sheets

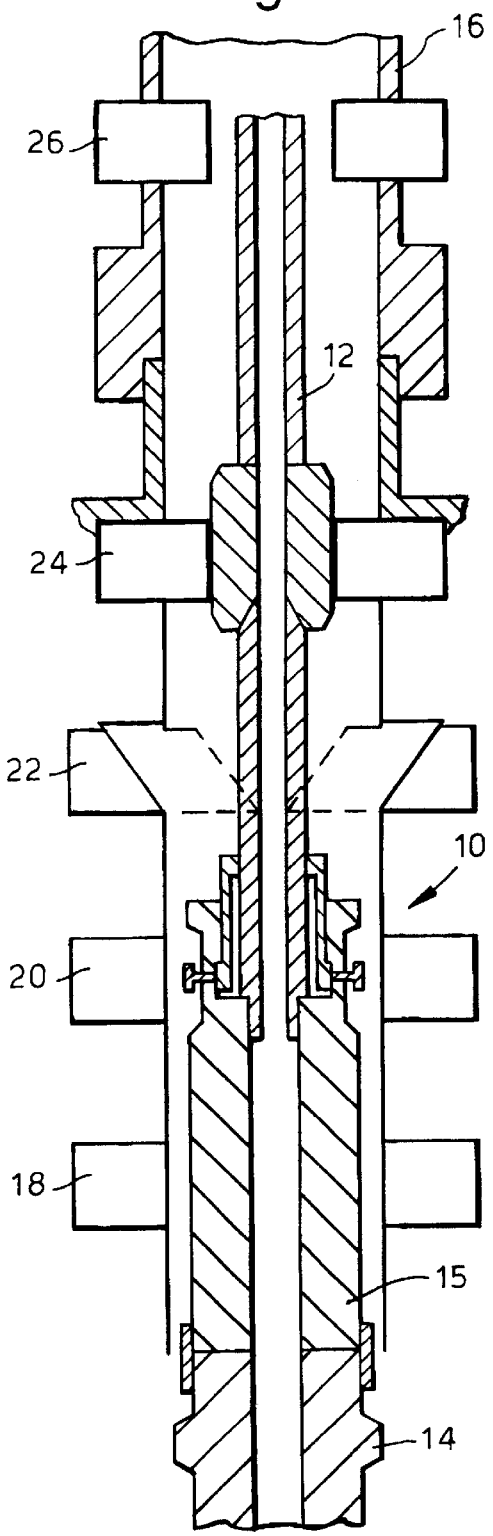
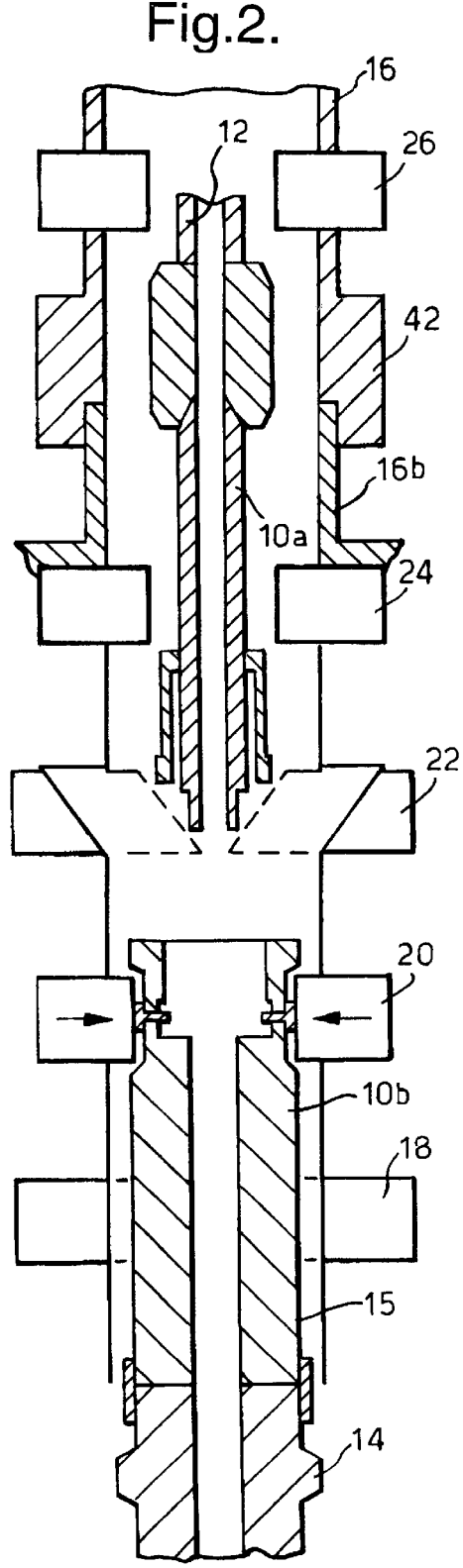

TUBING HANGER LANDING STRING WITH BLOWOUT PREVENTER OPERATED RELEASE MECHANISM

BACKGROUND OF THE INVENTION

This invention relates to the disconnection of landing strings from tubing hangers in subsea wells, and their subsequent reconnection.

The tubing hanger landing string is used to install, retrieve or work on a tubing hanger. When locked to the tubing hanger it sits within the blowout preventer (BOP) stack. One of the main functions of the BOP is to be able to isolate the well and permit disconnection of the riser via a lower riser package on the BOP. This must be done rapidly in emergencies, such as when a drilling or service vessel from which the riser is deployed is driven off station in bad weather.

In order to allow emergency riser disconnection during tubing hanger operations, landing strings have previously been designed with either a hydraulic latch or shearable joint (shear sub), or both. There are advantages and disadvantages to either option. The hydraulic latch is advantageous in that once disconnected it is quick and simple to reconnect. The disadvantage is that it adds equipment cost and operational complexity. When an emergency arises, the hydraulic latch requires a complex decision process, i.e. operate hydraulic controls at the surface to disconnect landing string—wait—lift landing string clear of BOP—initiate BOP closure and then disconnect the riser at the lower riser package. The advantage of the shear sub is that during an emergency, all that is required is to initiate BOP closure and disconnect. The BOP shear rams are used to sever the shear joint, disconnecting the tubing hanger landing string. Together with other closure elements of the BOP, the shear rams also act to close in the well, allowing disconnection of the riser containing the severed landing string. This is clearly a simpler and safer operation, less prone to errors. The disadvantage of the shear sub is that following a shear and disconnect, costly and time consuming recovery operations are required to reconnect to the well.

It would be desirable to provide equipment on the landing string which can be used simply and rapidly to disconnect from the tubing hanger but which can be reconnected again with minimum time and effort.

SUMMARY OF THE INVENTION

The present invention provides a coupling comprising a first part connected in use to a tubing hanger landing string and a second part connected in use to a tubing hanger, the first and second parts being disengageable from and re-connectable to each other, the coupling comprising a disconnection mechanism whereby, with the tubing hanger landed, the disconnection mechanism may be positioned within a BOP so as to be non-destructively engageable by closure elements of the BOP; such non-destructive engagement causing the mechanism to disengage the connector parts so as to separate the landing string from the tubing hanger.

The coupling may be directly connected to the tubing hanger in use, or it may comprise intervening components such as a tubing hanger running tool and/or a tubing hanger orientation joint.

The BOP closure elements may be, for example, pipe rams, which may operate a control element of the coupling arranged to control an actuator for the disconnection of the coupling. The control element may be, for example, an electrical switch or a hydraulic valve. The actuator may be an electrical, hydraulic or electro-hydraulic actuator operatively connected to a latch which releasably holds two parts of the coupling in engagement with each other.

Preferably, however, the mechanical action of the BOP closure elements as they engage the coupling itself causes disconnection of the coupling. For example, the coupling may comprise two parts releasably held in engagement with each other by collet fingers, pipe rams of the BOP acting upon the collet fingers to cause the disconnection. The pipe rams may act directly upon the collet fingers, or the rams may act on intermediate components such as actuator pins and a split ring which in turn act upon the collet fingers.

Further preferred features and advantages of the invention are set out below in the following description of illustrative embodiments, made with reference to the drawings.

BRIEF DESCRIPTION OF THE DRAWINGS

FIG. 1 is a diagrammatic representation of a tubing hanger landing string incorporating a coupling embodying the invention, received within a BOP;

FIG. 2 corresponds to FIG. 1, but shows parts of the coupling disconnected from each other;

DETAILED DESCRIPTION OF THE PREFERRED EMBODIMENTS

Figure 3:
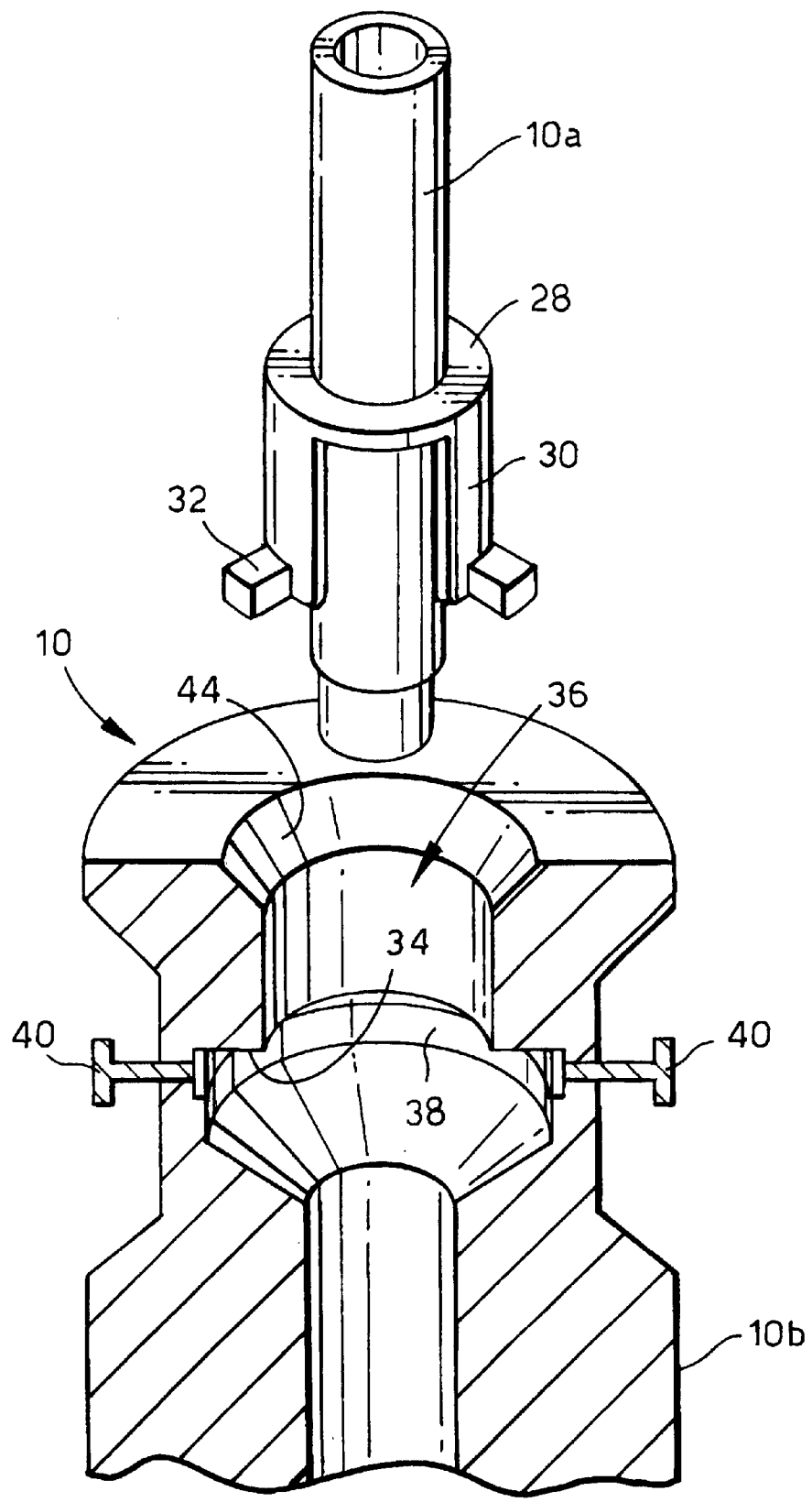
FIG. 3 is a perspective view, partly in section, showing the coupling in more detail.

The following description relates to couplings for use in a landing string which are operable via BOP pipe ram closure. The couplings then facilitate reattachment of the landing string after re-attachment of the riser. This results in a quick unlatch and a quick relatch and recovery.

Referring to FIG. 1, a coupling 10 is provided between a tubing hanger landing string 12 and a tubing hanger orientation joint 15. A tubing hanger running tool 14 and a tubing hanger (not shown) are connected in series below the orientation joint 15, as is well known. The lower end of the landing string 12, the coupling 10 and the tubing hanger orientation joint 15 are received within a BOP 16 when the tubing hanger has landed, e.g. in a wellhead, tubing spool or horizontal tree having a suitable external profile (not shown), to which the BOP is locked and sealed. The BOP 16 includes closure elements in the form of pipe rams 18, 20, a set of shear rams 22 and annular bags 24 and 26, as is also well known.

As shown by comparing FIGS. 1 and 2, the coupling 10 is acted upon by the pipe rams 20 so as to separate into an upper part 10a attached to the landing string 12 and a lower part 10b on the tubing hanger orientation joint 15. Components of the coupling are shown in more detail in FIG. 3. The upper part 10a carries an axially fixed collet 28 having three flexible fingers 30. Upwardly facing shoulders 32 formed on the ends of the fingers 30 are engageable beneath an undercut 34 formed in the bore 36 of the lower part 10b. The upper and lower parts 10a, 10b of the coupling are thus held in mutual engagement. The undercut 34 also accommodates an outwardly biased split ring 38. Captive actuator pins extend through the wall of the lower part 10b, so that their inner ends engage the split ring 38. The outer ends of the pins 40 are engageable by the pipe ram 20, which on closure moves the pins 40 and split ring 38 radially inwardly, thereby disengaging the collet finger shoulders 32 from the undercut 34. In this way the parts 10a and 10b of the coupling are disconnected. The pipe rams 18, 20 can be used to seal against the tubing hanger orientation joint 15 to shut in the well, and the annular bag 26 can seal against the landing string 12 to retain any fluids in the riser. A connector 42 can then be unlatched from the lower part of the BOP 16b, allowing removal of the riser containing the disconnected landing string 12. When required, the coupling parts 10a and 10b can be reconnected in a straightforward manner. The pipe rams 20 are opened, allowing the split ring 38 to expand. The shoulders 32 of the collet fingers 30 can then be re-engaged beneath the undercut 34. The bore 36 is provided with a flared upper end 44 for compressing the collet fingers and feeding the shoulders 32 into the undercut 34.

Figure 4:
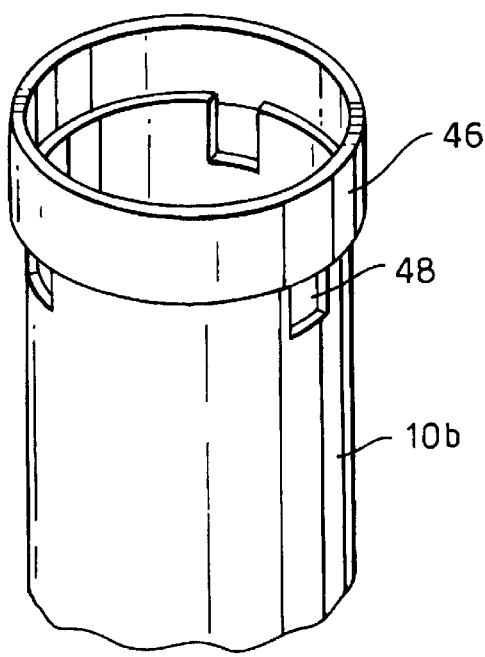
FIGS. 4 and 5 show a modified form of a coupling embodying the invention.
Figure 5:
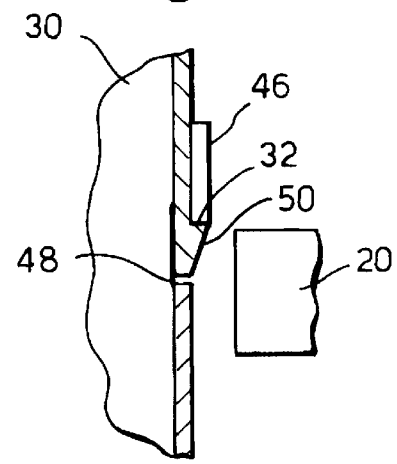

In an alternative embodiment shown in FIGS. 4 and 5, the shoulders 32 sit in apertures 48 formed in the coupling lower part 10b, engaging the lower face of a ring 46 attached to the lower part 10b. The pipe rams 20 can therefore directly engage the tips of the collet fingers 30, to displace them radially inwardly and disengage the shoulders from beneath the ring 46. A ramp surface 50 at the collet finger tips is used to feed the collet fingers into the ring 46. The coupling upper part can then be rotated about its longitudinal axis until the collet finger tips drop and/or snap into the apertures 48.

Figure 6:
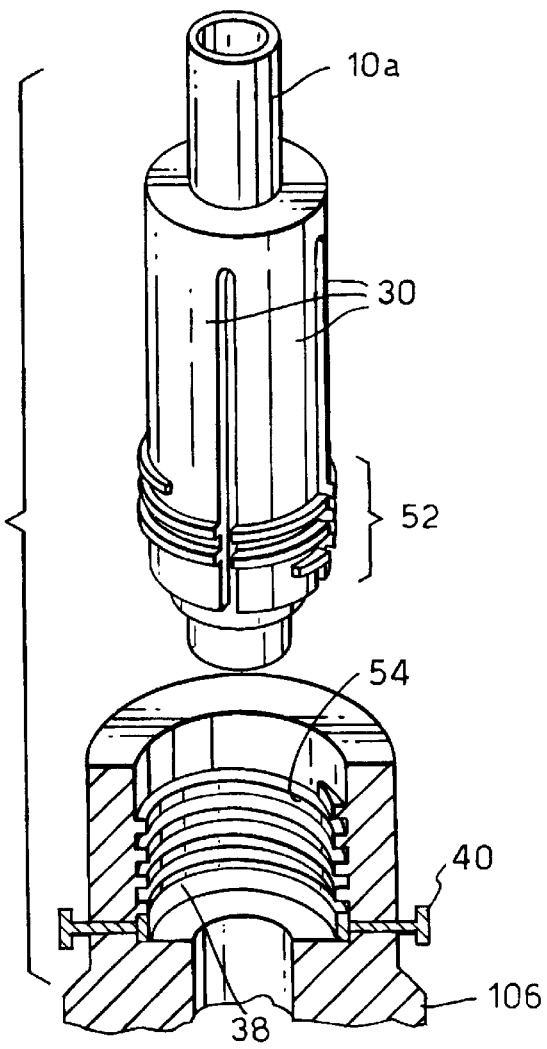
FIG. 6 shows a further modified form of a coupling according to the present invention.

FIG. 6 shows a modification of the FIG. 3 embodiment, in which the shoulders 32 on the collet fingers 30 are replaced by male buttress threads 52. These engage with a corresponding female thread 54 formed in the bore of the coupling lower part. Actuator 40 and split ring 38 when compressed inwardly by the pipe rams 20 flex the collet fingers 30 inwardly to disengage the threads 52 from the thread 54. After retraction of the pipe rams 20, the coupling upper part can be re-engaged with the lower part simply by rotating the landing string to screw the two parts together.

Many other variations and modifications will be readily apparent within the scope of the claims. For example, many other forms of resiliently biased latches will be appropriate to secure together the coupling upper and lower parts in a manner non-destructively releasable by engagement by one of the BOP closure elements 18, 20, 22, 24, 26. One or more of these closure elements could also activate control means for an actuator for a power operated latch connecting together the upper and lower parts of the coupling.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

What is claimed is:

1. A coupling comprising a first part connected in use to a tubing hanger landing string and a second part connected in use to a tubing hanger, the first and second parts being disengageable from and re-connectable to each other, the coupling comprising a disconnection mechanism whereby, with the tubing hanger landed, the disconnection mechanism may be positioned within a BOP so as to be non-destructively engageable by closure elements of the BOP; such non-destructive engagement causing the mechanism to disengage the connector parts and thereby separate the landing string from the tubing hanger.

2. A coupling as defined in claim 1, comprising a tubing hanger running tool and/or a tubing hanger orientation joint.

3. A coupling as defined in claim 1 wherein the BOP closure elements operate a control element of the coupling arranged to control an actuator for the disconnection of the coupling.

4. A coupling as defined in claim 3 wherein the control element comprises an electrical switch or a hydraulic valve.

5. A coupling as defined in claim 3 wherein the actuator comprises an electrical, hydraulic or electro-hydraulic actuator operatively connected to a latch which releasably holds two parts of the coupling in engagement with each other.

6. A coupling as defined in claim 1, wherein the mechanical action of the BOP closure elements as they engage the coupling itself causes disconnection of the coupling.

7. A coupling as defined in claim 6, comprising two parts releasably held in engagement with each other by collet fingers, the BOP closure elements acting upon the collet fingers to cause the disconnection.

8. A coupling as defined in claim 7 wherein the BOP closure elements act directly upon the collet fingers.

9. A coupling as defined in claim 7 wherein the BOP closure elements act on intermediate components which in turn act upon the collet fingers.

10. A coupling as defined in claim 9 wherein the intermediate components comprise an actuator pin and a split ring.

11. A coupling for releasably connecting a tubing hanger landing string to a tubing hanger, the coupling comprising:
    a first part which is connected to the landing string;
    a second part which is connected to the tubing hanger; and
    means for releasably connecting the first part to the second part, the connecting means being positioned opposite a closure member of a BOP when the tubing hanger is landed within a wellhead component;
    wherein upon closing, the BOP closure member will actuate the connecting means to disconnect the first part from the second part; and
    wherein following disconnection of the first part from the second part, the connecting means is operable to reconnect the first part to the second part.

12. The coupling of claim 11, wherein the connecting means comprises:
    a latch which is connected to one of the first and second parts; and
    at least one groove which is formed on the other of the first and second parts;
    wherein a portion of the latch is received in the groove to connect the first part to the second part; and
    wherein the BOP closure member operates to displace the latch from the groove to disconnect the first part from the second part.

13. The coupling of claim 12, wherein the latch comprises a plurality of collet fingers which are resiliently connected to one of the first and second parts.

14. The coupling of claim 12, wherein the connecting means further comprises:
    a plurality of actuator pins which are movably supported in the first or second part adjacent the groove;
    wherein upon closing, the BOP closure member will engage the actuator pins which in turn will displace the latch from the groove.

15. The coupling of claim 11, wherein the connecting means comprises:
    a plurality of collet fingers, each of which comprises a first end which is connected to one of the first and second parts and a second end on which a shoulder portion is formed; and at least one groove which is formed on the other of the first and second parts and which is adapted to receive the shoulder portions;

wherein the shoulder portions are received in the groove to connect the first part to the second part; and wherein the BOP closure member operates to displace the shoulder portions from the groove to disconnect the first part from the second part.

16. The coupling of claim 15, wherein the connecting means further comprises:

a plurality of actuator pins which are movably supported in the first or second part adjacent the groove;

wherein upon closing, the BOP closure member will engage the actuator pins which in turn will displace the shoulder portions from the groove.

* * * * *